United States Patent
Cnare

[11] 3,782,888
[45] Jan. 1, 1974

[54] METHOD AND APPARATUS FOR HEAT TREATING WITH HEAT RECUPERATION FROM MATERIAL COOLING AND AUXILIARY HEAT DURING STARTUP

[75] Inventor: Robert F. Cnare, Pewaukee, Wis.

[73] Assignee: Allis-Chalmers Corporation, Milwaukee, Wis.

[22] Filed: Oct. 4, 1972

[21] Appl. No.: 294,879

[52] U.S. Cl. .................................. 432/14, 432/18
[51] Int. Cl. ............................................. F27b 7/02
[58] Field of Search .................. 432/14, 18, 78, 106

[56] References Cited
UNITED STATES PATENTS

| | | | |
|---|---|---|---|
| 3,599,945 | 8/1971 | Helming | 432/14 |
| 3,416,778 | 12/1968 | Chabaglian | 432/78 |
| 3,313,534 | 4/1967 | Frans | 432/78 X |
| 3,100,106 | 8/1963 | Bielenberg et al. | 432/18 |

*Primary Examiner*—John J. Camby
*Attorney*—Arthur M. Streich et al.

[57] ABSTRACT

A method and apparatus is disclosed for heat treating mineral ore materials. The apparatus includes, in material series flow arrangement, a traveling grate preheater having at least one material drying zone and a preburn zone, a rotary kiln, and a cooler. The cooler has a first stage in which air becomes heated as the ore is cooled and this heated air is conducted through the kiln and preburning zones counter to material flow. The cooler has a second stage in which air is heated and thermal energy recuperated as the ore is further cooled and this second cooler stage air after being heated is conducted by a bypass conduit around the kiln and preburn zone to supply heat for drying the materials. An auxiliary air heater is associated with this bypass and according to the method disclosed, during start-up operation and before hot material arrives in the second stage of the cooler, the air heater is operated to heat the air conducted from the second stage of the cooler, for drying the material until hot material does arrive in the second stage of the cooler and thereafter heat transferred from the hot material to the air passing through the material in the second stage of the cooler, is utilized for drying the material. The disclosed apparatus operated according to the disclosed method, achieves improved fuel economy, more effective control of the drying or dehydrating operation, and such operation is achieved with a smaller kiln than heretofore required according to teachings of the prior art.

12 Claims, 3 Drawing Figures

METHOD AND APPARATUS FOR HEAT TREATING WITH HEAT RECUPERATION FROM MATERIAL COOLING AND AUXILIARY HEAT DURING STARTUP

CROSS REFERENCE TO RELATED APPLICATION

This application discloses an apparatus which is also operative to perform methods and processes which are the subject of a copending United States patent application of Glenn A. Heian and myself entitled "Process for Heat Hardening Agglomerates of Magnetite Iron Ore," Ser. No. 294,864, filed Oct. 10, 1972.

BACKGROUND OF THE INVENTION

1. Field of the Invention

The present invention relates to a method and apparatus for heat treating mineral ore material, and in particular to systems which have in series flow arrangement a preheater having at least two stages for drying and preburning material, a kiln, and a cooler.

2. Description of the Prior Art

United States Pat. No. 2,466,601 of 1949 discloses a system in which minerals are deposited upon a traveling grate and carried through a drying chamber, a preburning chamber and then are deposited in a rotary kiln for final burning. Hot gases in the kiln heat materials to high temperatures and then pass from the kiln to preburn and then dry the material before passing up a stack at relatively low temperatures. A number of methods for burning a number of materials have been successfully commercialized with such equipment. Iron ore, limestone, and limestone with clay are a few examples of such materials and examples of such methods are disclosed not only in U.S. Pat. No. 2,466,601, but also in U.S. Pat. No. 2,580,235 of 1951; U.S. Pat. No. 2,925,336 of 1960; U.S. Pat. No. 3,110,483 of 1963; U.S. Pat. No. 3,110,751 of 1963; U.S. Pat. No. 3,313,534 of 1967; U.S. Pat. No. 3,416,778 of 1968; U.S. Pat. No. 3,653,645 of 1972; and U.S. Pat. No. 3,671,027 of 1972.

One problem involved in the operation of a system as disclosed in the aforesaid U.S. Pat. No. 2,466,601 is that of obtaining proper thermodynamic balance of heat inputs among the drying, preburning and final heating stages. This problem arises because for each material there are three requirements that establish desired temperatures within such systems. The first requirement is that for each material there is a known or ascertainable heat input and temperature level to which the material must be finally heated in the rotary kiln. The second requirement is that each material also has a known or ascertainable temperature level and total heat input that is necessry to achieve the desired preburn before the material is exposed to much higher temperatures in the kiln. The third requirement is that each material also has a known or ascertainable desired maximum gas temperature for drying the material so that water vapor is not produced so rapidly that the material breaks into particle sizes so small that excessive dust is created. Thus a material requiring a relatively low drying temperature (to prevent particle breakup) will require a relatively large volume of gages (to completely dry the material) and a material that can tolerate a relatively high drying temperature may require a relatively small volume of drying gases. Although some materials burn with partly exothermic reactions (for example, magnetite iron ore), it is nevertheless true for all materials that the temperature and volume of the gases that perform the final heating and therefore determine the size of the kiln, are determining factors as to the temperature and volume of gases discharged from the kiln for preburning and drying material on the grate. Therefore, the degree to which the first requirement is achieved affects the degree to which the second and third requirements can be achieved. A problem of proper thermodynamic balance between the drying, preburning and final heating stages is created because the gas flow begins with a specific volume of preheated gas from the cooler mixing with burning fuel in the kiln to meet the first requirement and it is difficult (according to the practices of the prior art) to be sure that the volume and temperature of the gases finally reaching the drying chamber are what is needed to meet the third requirement, without providing the kiln that is oversize (as compared to a kiln required for the present invention) and without wasting heat up one or more stacks to atmosphere.

The aforesaid U.S. Pat. No. 3,313,534 discloses a system comprising a two-stage cooler, with preheated air from the first cooler stage passing into the kiln and air from the second stage discharged to atmosphere as waste heat, an auxiliary burner over the grate and a by-pass provided for some of the gas from the kiln to pass directly to the drying chamber. With such a system a regulated quantity of kiln gas that has not passed through material in the preburn chamber may be mixed with gas that has passed through the material in the preburn chamber and the mixture passed through material in the drying chamber. Although this system achieves proper thermodynamic balance, it requires more fuel and a kiln about 20 percent larger in diameter, than is required for a system according to the present invention, for a reason that will appear and be explained as this description of prior art proceeds.

U.S. Pat. No. 2,214,345 of 1940 and the aforesaid U.S. Pat. No. 2,580,235 disclose bypassing preheated air from the cooler around the kiln and preburn chambers to drying chambers and U.S. Pat. No. 2,580,235 additionally discloses one embodiment in which kiln gas can also be bypassed to a drying chamber without passing through material in the preburn chamber. However, such systems also require oversized kilns (as compared to the kiln size required for the about to be described present invention) for a reason that will now be explained. Oversized kilns are required because at startup and before hot pellets reach the cooler, the cooler provides no heat and all heat needed for the chambers over the grate must come from the gases passing through the kiln. The kiln must, accordingly, be sized to accommodate that greater (temporary) gas flow until hot pellets reach the cooler where some of their heat can be recovered and bypassed around the kiln to the chambers over the grate.

The aforesaid U.S. Pat. No. 2,214,345; 3,416,778; and 3,653,645 (in addition to U.S. Pat. No. 3,313,534) also disclose burners over a grate for aiding to achieve proper preburning on a grate ahead of the kiln. However, the burner over the grates in U.S. Pat. No. 2,214,345 does not in any way affect the temperature or volume of gases used for drying and therefore offers no solution to the problem of material being insufficiently dried and entering a second treatment chamber too wet, during startup operation before hot material has reached the cooler where thermal energy can be transferred to gases and used for drying. The burners over the grate in U.S. Pat. Nos. 3,313,534; 3,416,778; and 3,653,645 can affect the temperature of gases used for drying but after pellets begin to pass from the drying chamber into the preburn chamber the preburning operation utilizes heat which is therefore no longer available for the drying operation, and such systems, therefore, also require oversized kilns or overfiring the burners over the grate. Overfiring the above grate burners in the preburn chamber merely to provide excess heat for drying operations in undesirable because so doing can heat the upper layers of pellets in the preburn chamber beyond the preburn desired before the pellets begin to tumble through a kiln.

The present invention is directed to the problems of reducing kiln size and fuel requirements relative to tonnages of material treated, and providing controlled thermodynamic balance in such systems by the utilization of air heating means such as an auxiliary burner, at a novel location, for operation according to a method that will be described.

SUMMARY OF THE PRESENT INVENTION

According to the present invention, provision is made for recuperating heat from a cooler by preheating air in a second stage of the cooler, bypassing such preheated air around the kiln and at least around a preburn chamber over a grate which is next adjacent the kiln, and with the invention being characterized by the provision of a heater that can be operated to inject thermal energy into the air stream from the second stage of the cooler that bypasses the kiln and is used for drying operations at least during startup when hot material has not yet progressed to the second stage of the cooler. The air heater for cooler gases bypassing the kiln to a drying chamber, can according to this invention be utilized with a bypass discharge gases around the preburn chamber and with two stage drying, in a manner that will appear as the description of this invention proceeds with reference to the accompanying drawings.

DESCRIPTION OF THE PREFERRED EMBODIMENTS

Figure 1:
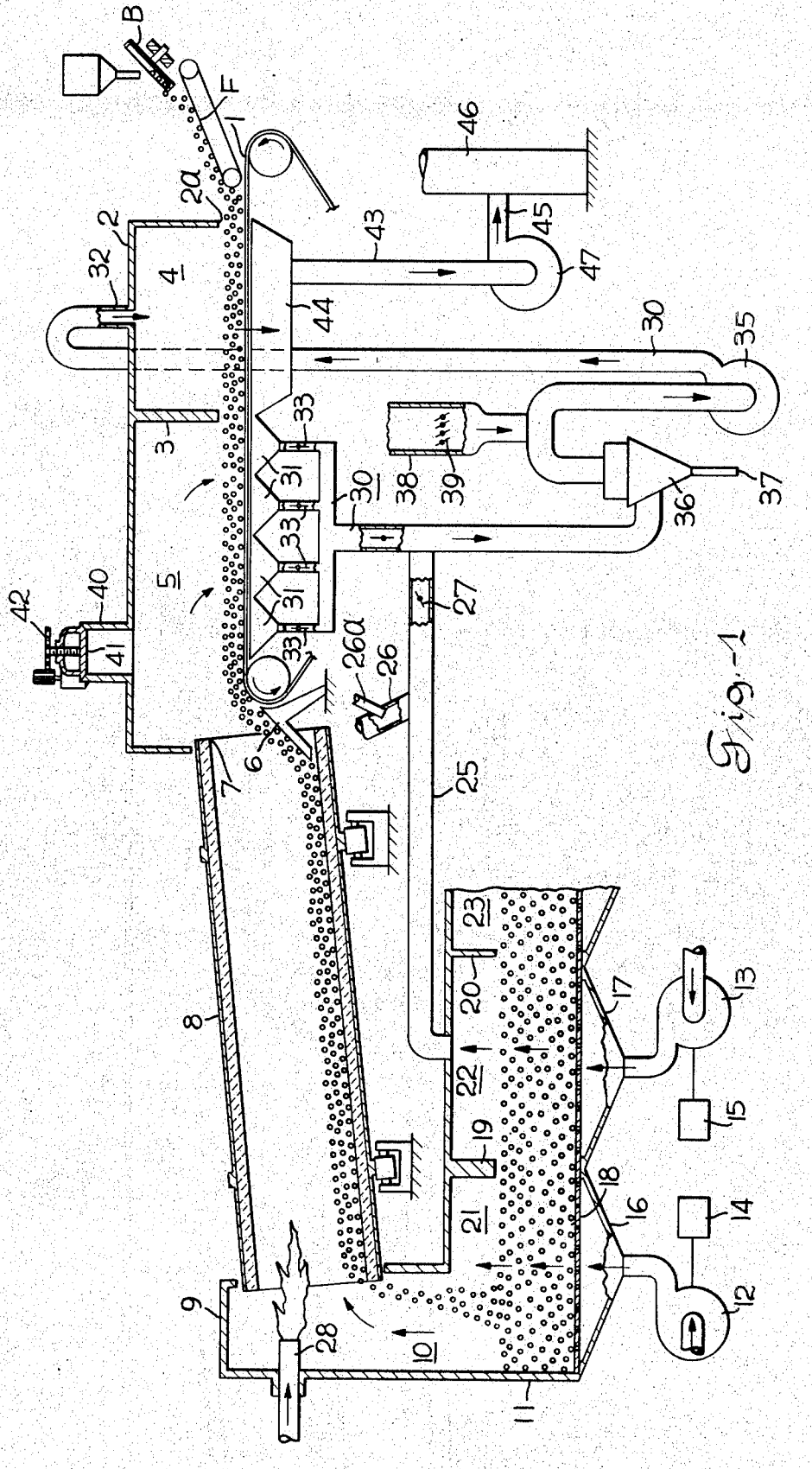
FIG. 1 of the accompanying drawings shows diagrammatically a side elevation, partly in section, an apparatus according to the present invention comprising a traveling grate preheater having a drying and preburning chamber, a rotary kiln and a multi-chamber cooler, all in series flow arrangement.

Referring to FIG. 1 of the drawing, raw material is prepared for the apparatus to be described, by a suitable agglomerating device which may be, as shown for example, a balling pan B or a drum as shown in U.S. Pat. No. 1,775,313. A feeder F deposits the green (i.e., untreated) balls of raw materials on a gas pervious travelling grate 1. A housing structure 2 is arranged to enclose a space over grate 1 and define a material inlet opening 2a. A baffle wall 3 is suspended from the roof of housing 2 to a predetermined distance above grate 1. Baffle wall 3 divides the space enclosed by housing 2 into a drying chamber 4 and a preburn chamber 5. Green balls on grate 1 will be transported through drying chamber 4, then preburn chamber 5 and then discharged down a chute 6 into an inlet opening 7 of a refractory lined rotary kiln 8.

Rotary kiln 8 slopes downwardly from chute 6 toward a hood 9 that encloses the discharge end of kiln 8 and defines a passage 10 from kiln 8 to a cooler 11. The downward slope of the rotary kiln 8 causes material received from chute 6 to pass through kiln 8, then into hood 9 and through passage 10 to the cooler 11.

The cooler 11 is provided with a pair of blowers 12, 13, which may be driven by variable speed driving motors 14, 15, that blow controlled quantities of air upwardly through windboxes 16, 17 and then through material on an air pervious grate 18. Baffles 19, 20 may be provided to divide cooler 11 into a first stage cooling chamber 21, a second stage cooling chamber 22, and a third stage cooling chamber 23 over grate 18. As indicated by arrows, cool air supplied by blower 13 is blown upwardly through windbox 17, grate 18 and chamber 22 into a first conduit which is a bypass 25 having a heater 26, which includes a burner 26a, and a damper 27 for a purpose that will appear from the description to follow. Cool air supplied by blower 12 is blown upwardly through windbox 16, grate 18, chamber 21, and passage 10 into the firing hood 9. A burner 28 is mounted in hood 9 to project into hood 9 to deliver and burn fuel that raises the temperature of gases passing into kiln 8 to the desired high temperature level required for a material receiving a final heat treatment in kiln 8. In plants producing Portland cement, the gases entering the kiln 8 will heat the material in the kiln to over 2,500°F. In plants producing hard pellets of iron ore, pellets will be heated in the kiln 8 to about 2,450°F.

Gas flow from the gas discharge end of kiln 8, up chute 6, and into the material preburn chamber 5, will be in a temperature range of about 1,600°–2,200°F.

Gas conveying means will now be described that connect preburning chamber 5 to preconditioning chamber or drying chamber 4. A second conduit means 30 is provided which includes on its first end a windbox 31 arranged beneath grate 1 and preburn chamber 5, to connect the windbox end 31 of conduit 30 to chamber 5. The conduit means 30 has a second end 32 connected to the housing structure 2 over drying chamber 4. The bypass conduit 25, from the second stage 22 of cooler 11, is connected to the conduit means 30 intermediate its ends 31, 32. Dampers 33 may be provided in the conduit means 30 upstream of bypass 25 for controlling the flow of gas through conduit 30 from preburn chamber 5. A preburn gas exhaust fan 35 is provided in the conduit 30 between bypass conduit 25 and drying chamber 4, for drawing into conduit 30 air from the second stage 22 of cooler 11 and gas passing from kiln 8 into chamber 5, with the mix of this air and gas being controlled by dampers 27, 33, for delivery to drying chamber 4. One or more devices such as cyclone dust collectors 36 having a solid discharge opening 37 may be provided in conduit 30 between bypass 25 and fan 35. A cold air inlet 38 with a damper 39 is connected to the conduit 30 at a location downstream of dust collector 36 and upstream of fan 35 to provide for insuring that gas drawn into fan 35 will not overheat fan 35. To insure that the gases passing from kiln 8 into chamber 5 and down through grate 1 in chamber 5, and air from the second stage 22 of cooler 11, contains sufficient heat as required for the desired drying of material in chamber 4, the fuel burner 26 projecting into bypass conduit 25, may be operated as will appear from the description of the operation of the entire plant to follow. An auxiliary stack 40 above the grate 1 in chamber 5, is also provided for a purpose that will be explained in the description of plant operation to follow. This stack 40 is closed by a cap 41 and has a lifting assembly 42 connected to cap 41, operative to lift cap 41 and open stack 40.

A third conduit means 43 is provided which includes on its first end a windbox 44 beneath grate 1 and connected to the drying chamber 4 between the preburn chamber 5 and the material inlet opening 2a of the drying chamber 4. A second end 45 of the third conduit 43 is connected to a stack 46 for discharging gas to the atmosphere. A drying gas exhaust fan 47 is provided in conduit 43 for drawing gas therethrough for discharge up stack 46. A fine dust collector (not shown) may be provided in conduit 43, which may be an electrostatic precipitator, gas permeable bags, wet scrubbers or cyclone dust collectors.

A method of operation applied to the apparatus of FIG. 1 will be described, by way of example only, as it can be prectised to heat harden pellets of hematite iron ore.

Pellets containing hematite ore are formed in the balling device B and placed upon the grate 1 by a feeder F for transport through chamber 4. The heat transfer from gas to pellets in chamber 4 must be carefully controlled to properly precondition the pellets before they are transported into the preburn chamber 5. That is, in chamber 4 the pellets must be dried as they are heated from about 70°F to an average temperature of about 450°F, but the pellets must not be heated too fast or exposed to too high temperatures in order to avoid pellet break-up and dust formation that could block a flow of gas through the bed of pellets in preburn chamber 5. However, during initial stages of startup operations, the auxiliary stack 40 is opened and fuel from kiln burner 28 is burned to bring the refractory lined kiln 8 up to operating temperatures. During this period of startup operation no heated gas is as yet passing into windboxes 31 and conduit 30 for passage to drying chamber 4. Likewise, during this period of startup operation, no hot pellets have as yet arrived in the second stage 22 of cooler 11, to provide heat for transfer to the air from fan 13 that passes into bypass 25.

In a plant startup according to the method of the present invention, the burner 26 is ignited to burn fuel and heat air in bypass 25, which with dampers 33 closed, provides hot air for passage through conduit 30 to the outlet end 32 in housing 2 above drying chamber 4. Burners 26 may be used to heat the air to temperatures over 1,000°F which may be tempered by ambient air admitted through air inlet 38 to provide a relatively large quantity of air at temperatures which may be of the order of 500° to 750°F. The pellets are thereby dried as they pass through chamber 4 and heated to about 450°F. As they dry pellets pass into preburn chamber 5 and provide a protective cover for grate 1, dampers 33 may be opened to allow hot gases at temperatures over 1,800°F from kiln 8 to pass downwardly through the pellets and into windboxes 31. Pellets in chamber 5 are heated to an average temperature of about 1,800°F or higher and the gases which have given up much of their heat pass into windboxes 31. As dampers 33 are opened, the auxiliary stack 40 can be closed and the heat input by burner 26 can be reduced.

After the pellets have been given the desired preburn treatment in chamber 5, the bed of pellets on grate 1 is disrupted and the pellets are tumbled through kiln 8 wherein they are heated to about 2,400°F. The hot pellets are discharged from kiln 8 and fall through passage 10 to the grate 18 of cooler 11. After the pellets pass through stages 21, 22, and 23 of cooler 11 they are cooled sufficiently for handling and storage.

The air from chamber 21 of cooler 11, that has been preheated to about 1,500°F as it passes through the pellets on grate 18, passes up passage 10 and into kiln 8. The flame and gases from burner 28 mix with the air from cooler 11 to provide an atmosphere in kiln 8 that is over 2,400°F. These high temperature gases move counter to the flow of pellets through kiln 8 and pass into preburn chamber at over 1,800°F.

Pellets moving from the first stage 21 of cooler 11 into the second stage 22 may be at temperatures of 700° to 800°F and air from fan 13 passing through these pellets recuperates heat from the pellets and is heated to temperatures which may be for example in the range of 500° to 750°F. With the air passing through bypass 25 being so heated and joining with hot gas from windbox 31, there will be in most instances sufficient heat available for tempering with atmospheric air through inlet 38, to provide the temperatures and quantity of gas needed to dry the pellets in chamber 4. Auxiliary stack 40 may therefore be completely closed and burner 26 shut off.

Thus with the apparatus shown in FIG. 1 and the method that has been described, heat requirements during startup operations and after startup operation are provided for without the need to oversize burner 28 and kiln 8 (i.e., oversize as compared to what is needed for after startup operation) as was the prior practice in this technology, and without the danger of overheating pellets in the upper layers of the bed in chamber 5 as could happen if overgrate auxiliary burners were relied upon as the only added heat source needed for startup operations.

Figure 2:
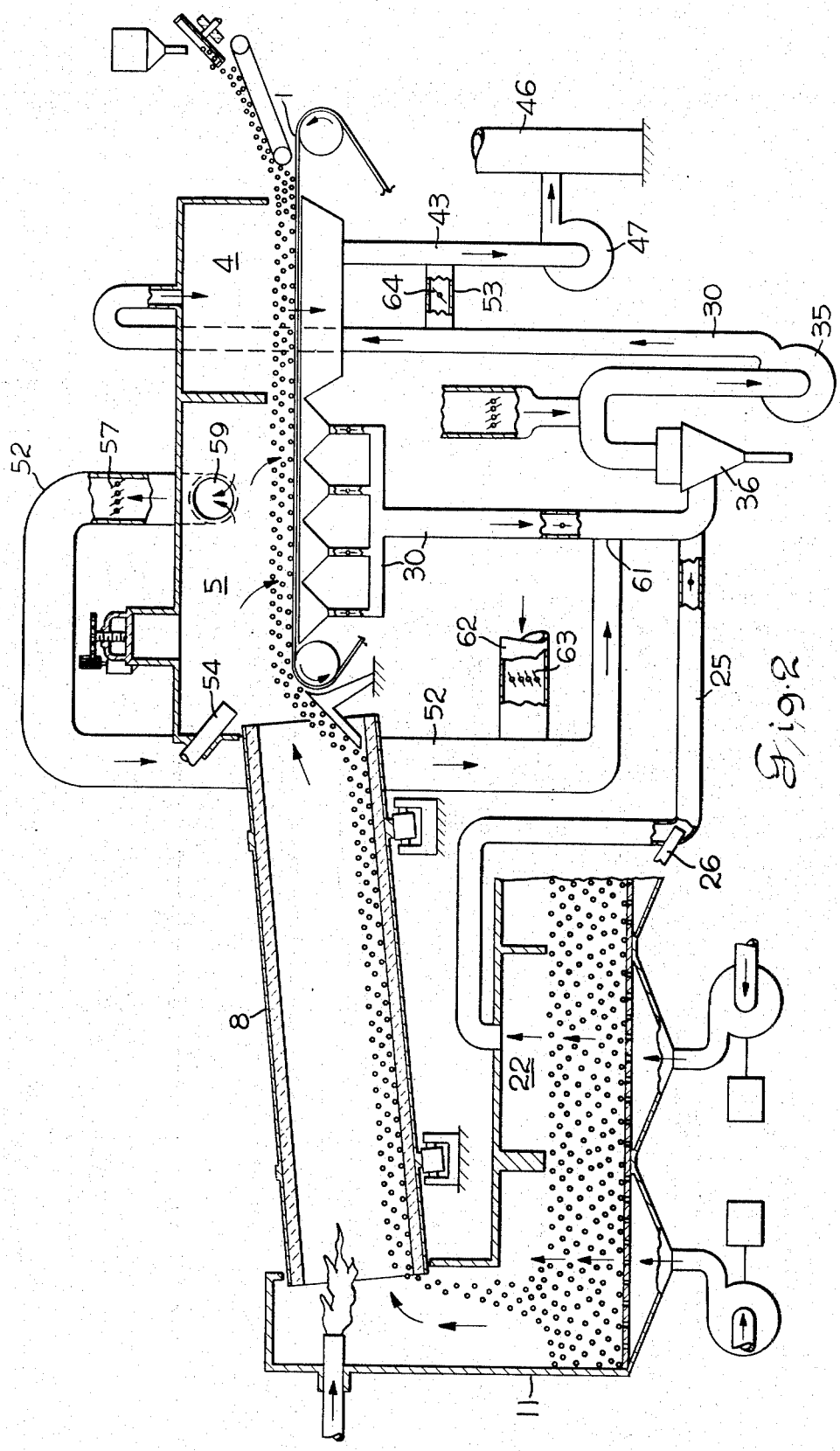
FIG. 2 of the accompanying drawings shows diagrammatically a side elevation, partly in section, another embodiment of the present invention in which the apparatus of FIG. 1 is also provided with an auxiliary burner over the grate and a bypass for kiln discharge gases to flow around the preburning chamber to the drying chamber.

Referring to FIG. 2, a system is illustrated that will now be described, that is similar to FIG. 1, but with the addition of a fourth conduit 52 for bypassing kiln discharge gases around the preburn chamber 5 to the drying chamber 4, a fifth conduit 53 for bypassing combined gas-air streams around drying chamber 4, and an auxiliary burner 54 over the grate 1 in preburn chamber 5, all for purposes that will be explained.

The fourth conduit 52, including dampers 57, is shown connected on the first end to an exhaust opening 59 over the grate 1 in preburn chamber 5. The fourth conduit 52 provides a means for withdrawing gas from preburn chamber 5 to bypass the material in preburn chamber 5 and discharge such gas into conduit 30 at a location 61 upstream from bypass 25 and dust collector 36. A cold air inlet 62 with a damper 63 is arranged to admit a controlled flow of tempering air through the cold air inlet 62 and into conduit 52.

The fifth conduit 53 includes a damper 64 and is connected on one end to the conduit 30 at a location between fan 35 and drying chamber 4, and the second end of conduit 53 is connected to the conduit 43 upstream of the fan 47.

Startup operations according to the methods of the present invention, for the plant shown in FIG. 2, can begin and proceed in a manner similar to that described for the plant in FIG. 1. However, some hot gas from kiln 8 may be withdrawn through the opening 59 in chamber 5 and bypassed through the conduit 52 to conduit 30 to help supply the thermal energy needed to dry pellets in chamber 4. Thus the amount of fuel burned through burner 26 in bypass conduit 25 can be reduced or reduced somewhat sooner, or even turned off completely (temporarily) and if additional thermal energy is required for the desired preburn of pellets at the end of grate 1 in chamber 4, such needs can be supplied by burner 54 over the discharge end of grate 1. However, when pellets arrive in kiln 8 (but have not yet arrived in the second stage 22 of cooler 11) there may be no excess of heat available over that required in kiln 8 and preburn chamber 5, for passing into bypass 52 in sufficient quantity to supply the need in drying chamber 4, unless kiln 8 and/or burner 54 are oversized and overfired (compared to requirements for operation after hot pellets arrive in cooler stage 22). Providing an oversized kiln is undesirable because of the costs involved and providing more heat with the over-the-grate burner 54, that is, more than needed for the treatment of pellets in preburn chamber 5 for the purpose of supplying heat to bypass 52 for use in drying chamber 4, is also undesirable because so doing can heat the upper layer of pellets in chamber 5 beyond the preburn desired before the pellets begin tumbling through kiln 8. Thus, during startup and after pellets pass from chamber 5 into kiln 8 but before hot pellets arrive in the second stage 22 of cooler 11, it is more efficient and process requirements are better met by firing burner 26 in bypass 25 to supply heat to the drying chamber 4.

Any temporary oversupply of heat to chamber 4 can be taken care of by opening damper 64 and bypassing some of the gas from conduit 30 through the third bypass 53 to conduit 43 and stack 46.

Figure 3:
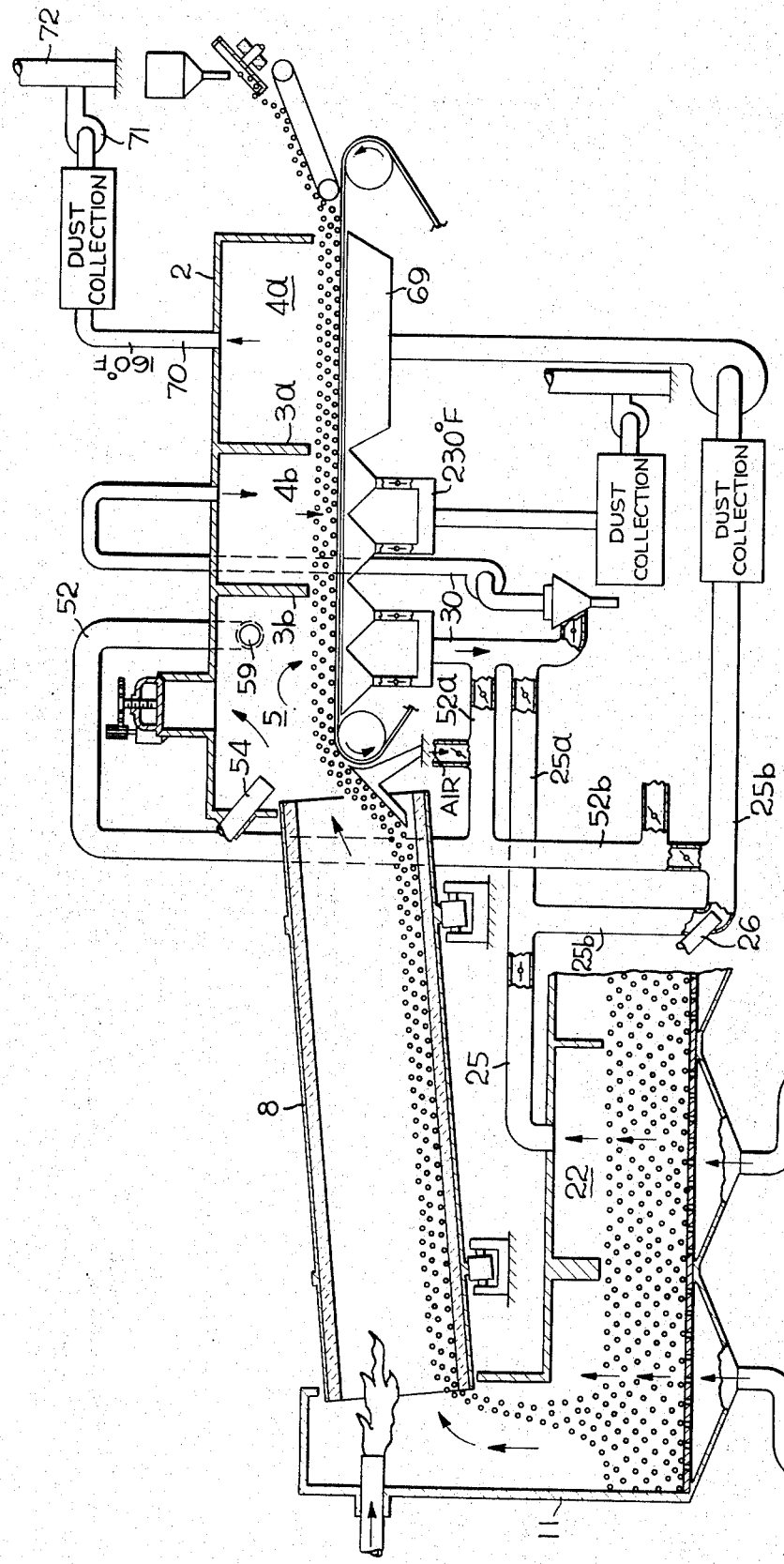
FIG. 3 of the accompanying drawings shows diagrammatically a side elevation, partly in section, still another embodiment of the present invention in which the system of FIG. 2 is provided with two stage drying on the traveling grate preheater.

Referring to FIG. 3, a system is shown that is similar to FIG. 2, but with certain other modifications that will now be described. The housing 2 is provided with baffles 3a and 3b for two-stage drying comprising a first-stage drying chamber 4a (updraft) followed by a second-stage drying chamber 4b (downdraft). Bypass conduit 25 has a branch 25a to supply hot gas via conduit 30 to downdraft drying chamber 4b and a branch 25b to supply hot gas to updraft drying chamber 4a. The bypass conduit 52 conducts discharge gases from kiln 8 to bypass branch 25b to an updraft windbox 69 beneath chamber 4a, and burner 26 is located in bypass branch 25b. Bypass conduit 52 may also be divided into two branches 52a and 52b. Branch 52a is connected to conduit 30 to supply hot gas to downdraft drying chamber 4b and branch 52b is connected to bypass branch 25b to supply hot gas to updraft drying chamber 4a. Gas is drawn off from the updraft drying chamber 4a through a conduit 70 having a fan 71, and discharged to the atmosphere through a stack 72.

Startup operations according to the method of the present invention, for the plant shown in FIG. 3, can begin and proceed in a manner similar to that described for the plant in FIG. 2. However, with pellets in chamber 4a but not yet in chamber 4b, hot gas may be withdrawn through the opening 59 in chamber 5 and bypassed through conduit 52, 52b, and 25b to updraft drying chamber 4a, with burner 26 providing an alternate or additional heat source. After pellets advance into downdraft chamber 4b hot gases may be passed through branch 52a and conduit 40 to downdraft chamber 4b, and burner 26 may provide the heat needed for updraft chamber 4a. After pellets advance into preburn chamber 5, kiln gases passing downwardly through pellets and preburn chamber 5 and into conduit 30 will flow to downdraft chamber 4b and burner 26 will continue to supply the heat requirements to updraft chamber 4a. When hot pellets arrive in the second stage 22 of cooler 11, the air passing into conduit 25 will become heated and by flowing through conduit 25a, and conduit 30, can supply heat to downdraft chamber 4b while heated air flowing through conduit 25b will supply heat to updraft chamber 4a. This arrangement therefore also provides all the heat needed, when needed and where needed, without the need to oversize kiln 8 or inject more heat than desirable through an over-the-grate burner 54 if such an over-the-grate burner is considered necessary to provide a proper heat balance.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are or may hereafter be appended hereto.

The embodiments of the invention in which an exclusive property or privilege is claimed are defined as follows:

1. In a material furnacing apparatus having structures defining at least a chamber for preconditioning material having a material inlet opening, a chamber for preburning material, a chamber for final heating material having a material inlet opening facing the preburning chamber, a first fuel burner in close proximity to a material discharge opening of the final heating chamber, a first stage cooling chamber and a second stage cooling chamber, with said chambers being connected together in series flow arrangement to define a material flow stream through said preconditioning chamber, the preburning chamber, the final heating chamber, the first stage cooling chamber, and the second stage cooling chamber, with the structures defining a passage for a counterflow of gas from said first stage cooling chamber through the final heating chamber to said preburning chamber, and:

a. A first conduit means connected on the first end thereof to the second stage cooling chamber at a location operative to discharge therefrom air that has passed through material therein;

b. A second conduit means connected on the first end thereof to the preburn chamber at a location on a side of the material stream opposite to the flow of gas through the passage, and a second end of the second conduit means being connected to the preconditioning chamber;

c. A second end of the first conduit means connected to the second conduit means;

d. Third conduit means connected to the preconditioning chamber at a location on a side of the material stream opposite the second end of the second conduit means and between the preburn chamber and the material inlet opening of the preconditioning chamber, for exhausting gas from the preconditioning chamber; and e. A heater connected to the first conduit means operative with a source of thermal energy independent of the first fuel burner, for heating air flowing through said first conduit during startup operations when hot material from the final heating chamber has not yet passed into said second stage cooling chamber and any other period of operation when more heat is required than is being recuperated from material in the second stage cooling chamber.

2. A material furnacing apparatus according to claim 1 having a fourth conduit means connected on the first end to the preburn chamber on the side of the material stream facing the flow of gas through the passage and on a second end thereof to the second conduit.

3. A material furnacing apparatus according to claim 2 having auxiliary heating means projecting into the preburn chamber on the side of the material stream facing the flow of gas through the passage and between the material inlet opening of the final heating chamber and the first end of the fourth conduit means.

4. A material furnacing apparatus according to claim 2 having a fifth conduit means connecting the second conduit means at a location downstream of both the first and fourth conduit means, to the third conduit means.

5. In a material furnacing apparatus having a traveling grate enclosed by structures defining at least a first stage drying chamber, second stage drying chamber and a chamber for preburning material, a rotary kiln for final heating material having a material inlet opening facing the preburning chamber, a first fuel burner in close proximity to a material discharge opening of the kiln, a first stage cooling chamber, and a second stage cooling chamber, with said chambers and kiln being connected together in series flow arrangement to define a material flow stream through said first and second drying chambers, the preburning chamber, the kiln, the first stage cooling chamber, and the second stage cooling chamber, and with the structures defining a passage for a counterflow of gas from the first stage cooling chamber through the kiln to said preburning chamber, and;

a. A first conduit means connected on a first end thereof to the second stage cooling chamber at a location operative to discharge therefrom air that has passed through the material therein;

b. A second conduit means connected on a first end thereof to the preburn chamber at a location beneath the grate, and a second end of the second conduit means being connected above the grate to the second stage drying chamber;

c. A second end of the first conduit means having a first branch connected to the second conduit means and the second branch connected beneath the grate to the first stage drying chamber;

d. Third conduit means connected above the grate to the first stage drying chamber for exhausting gas from the first stage drying chamber; and e. A heater connected to the first conduit means operative with a source of thermal energy independent of the first fuel burner, for heating air flowing through said first conduit during startup operations when hot material from the kiln has not yet passed into the second stage cooling chamber and any other period of operation when more heat is required than is being recuperated from material in the second stage cooling chamber.

6. A material furnacing apparatus according to claim 5 having a fourth conduit means connected on a first end to the preburn chamber above the grate and on the second end thereof to the second branch of the first conduit.

7. A material furnacing apparatus according to claim 6 having the second end of said fourth conduit having a connection to the first branch of the first conduit.

8. In a method of heat treating material including steps in which such material is fed successively through preconditioning, preburning, final heat treating, first stage cooling and second stage cooling zones; and air from the first stage cooling zone is heated from a source of thermal energy to provide heated gases which are directed through the final heat treating zone, preburning and preconditioning zones, the steps comprising:

a. Passing air through the second stage cooling zone and bypassing this air around the final heat treating and preburning zones to pass through material in the preconditioning zone;

b. Heating and air from the second stage cooling zone with a source of thermal energy independent of the source of thermal energy utilized in the step of heating air from the first stage cooling zone, at least until material heated in the final heat treating zone arrives in the second stage cooling zone; and c. Thereafter transferring heat from the material in the second stage cooling zone to the air passing therethrough and utilizing this heated air to heat treat material in the preconditioning zone.

9. A method according to claim 8 and in the step of heating the air from the second stage cooling zone with a source of thermal energy independent of the source of thermal energy utilized in the step of heating air from the first stage cooling zone, burning fuel and mixing air therewith to heat the air that passes to and through material in the preconditioning zone to a temperature in the range of about 500° to 750°F.

10. A method according to claim 8 with the added steps of withdrawing from the preburning zone a portion of the heated gases that have been directed through the final heating zone, to bypass the said withdrawn portion away from material in the preburning zone, and mixing the said withdrawn portion with the air passing from the second stage cooling zone to the preconditioning zone, to add heat thereto and provide a first mix for heat treating material in the preconditioning zone at least when excess heat is available in the gases from the final heating zone and until material heated in the final heat treating zone arrives in the second stage cooling zone.

11. A method according to claim 10 in which the preconditioning zone heat treatment is divided into a first stage and a second stage, dividing into a first branch and a second branch the heated gases withdrawn from the preburning chamber and away from the material therein, mixing the said first branch of gases with gases from the final heating zone that have passed through material in the preburning zone to provide a second mix, and passing this second mix through material in the second preconditioning stage, and mixing the second branch of gases with the air from the second stage cooling zone for passing through material in the first preconditioning stage.

12. A method according to claim 11 in which the air from the second stage cooling zone is divided into a first branch and a second branch, mixing the first branch of air with the gases from the final heating zone that have passed through material in the preburning zone, and mixing the second branch of air with the portion of heated gases withdrawn from the preburning zone away from material therein.

* * * * *